United States Patent [19]

Silfvast et al.

[11] 4,267,525
[45] May 12, 1981

[54] RECOMBINATION LASERS WITH SPATIAL VARIATIONS IN PUMPING

[75] Inventors: William T. Silfvast, Holmdel; Leo H. Szeto, Howell Township, Monmouth County, both of N.J.; Obert R. Wood, II, New York, N.Y.

[73] Assignee: Bell Telephone Laboratories, Incorporated, Murray Hill, N.J.

[21] Appl. No.: 27,672

[22] Filed: Apr. 6, 1979

[51] Int. Cl.$^3$ .................................................. H01S 3/09
[52] U.S. Cl. ............................ 331/94.5 G; 331/94.5 P
[58] Field of Search .................... 331/94.5 G, 94.5 D, 331/94.5 P; 350/96.15, 96.29

[56] References Cited

U.S. PATENT DOCUMENTS

| | | | |
|---|---|---|---|
| 3,711,785 | 1/1973 | Zitkus | 331/94.5 D |
| 3,711,790 | 1/1973 | Gans | 331/94.5 |

OTHER PUBLICATIONS

"A Recombination Laser from Cooled Hydrogen Plasma" by Ali et al., *Phys. Lett.*-vol. 55 A, No. 8, Feb. 1976, pp. 462–464.
"Recombination Lasers Utilizing Vapors of Chemical Elements" by Zhukov et al., *Sov. J. Quantwm Electron*, vol. 7, No. 6, Jun. 1977, pp. 704–707.
"Population Inversions with Respect to the Ground Level of an Ion or Atom by the Rapid Cooling of a Plasma" Green et al., *Appl. Phys. Lett.*, vol. 28, No. 5, Mar. 1976.
"Comparison of Radiation from Laser-Produced and DC-Heated Plasmas in Xenon" by Silfvast et al., *Appl. Phys. Lett.*, vol. 25, No. 5, Sep. 1974, pp. 274–277.
Recombination Lasers in Expanding $CO_2$ Laser-Produced Plasmas of Argon, Krypton and Xenon" by Silfvast et al., *Appl. Phys. Letts.*, vol. 31, No. 5, Sep. 1977.
"Ultra-High-Gain Laser-Produced Plasma Laser in Xenon Using Periodic Pumping" by Silfvast et al., *Appl. Phys. Letts.*, vol. 34, No. 3, Feb. 1979, pp. 213–215.
"Laser Oscillation in Laser-Produced Xenon and Argon Plasmas" by Silfvast et al., *Bull. Am. Phys. Soc.* 21 p. 1061 (1976).

*Primary Examiner*—William L. Sikes
*Assistant Examiner*—León Scott, Jr.
*Attorney, Agent, or Firm*—Michael B. Einschlag

[57] ABSTRACT

The small-signal gain from a recombination laser is increased by restricting the excitation of the laser amplifying medium to localized regions which are spatially separated from one another. The spatial separation between the regions of excitation provides for more efficient cooling of the plasma electrons in the excitation region and thereby increases the rate of recombination of these electrons with the ions of the laser amplifying medium. The efficient capture of electrons by ions enhances the population inversion of the laser transition in the laser amplifying medium.

18 Claims, 14 Drawing Figures

REFLECTING PRISMS

LIGHT GUIDES

THICK HOLOGRAMS

DIFFRACTION GRATINGS

BAR TARGETS

EVAPORATED STRIPE TARGETS

SANDWICH TARGETS 4,267,525

RECOMBINATION LASERS WITH SPATIAL VARIATIONS IN PUMPING

BACKGROUND OF THE INVENTION

The invention relates to the field of recombination lasers.

Recombination lasers have been produced by electronic discharge pumping as well as by laser-produced plasma pumping. Evidence of this is found in the following prior art references: (1) "Comparison of Radiation from Laser-Produced and DC-Heated Plasmas in Xenon", by W. T. Silfvast and O. R. Wood, II, *Applied Physics Letters*, Vol. 25, No. 5, September 1974, pp. 274–277, (2) "Recombination Lasers in Expanding $CO_2$ Laser-Produced Plasmas of Argon, Krypton and Xenon", by W. T. Silfvast, L. H. Szeto and O. R. Wood, II, *Applied Physics Letters*, Vol. 31, No. 5, September 1977, pp. 334–337, and (3) "Recombination Lasers Utilizing Vapors of Chemical Elements I. Principles of Achieving Stimulated Emission Under Recombination Conditions", by V. V. Zhukov, E. L. Latush, V. S. Mikhalevskii and M. F. Sem, *Soviet Journal of Quantum Electronics*, Vol. 7, No. 6, June 1977, pp. 704–708.

References 2 and 3, as well as the following prior art references: (4) "Population Inversion with Respect to the Ground Level of an Ion or Atom by the Rapid Cooling of a Plasma", by J. M. Green and W. T. Silfvast, *Applied Physics Letters*, Vol. 28, No. 5, March 1976, pp. 253–255, and (5) "Recombination Laser from Cooled Hydrogen Plasma (Plasma Dynamic Laser)", by A. W. Ali and W. W. Jones, *Physics Letters*, Vol. 55A, No. 8, February 1976, pp. 462–464, indicate that the recombination rate of electrons and ions in the amplifying medium of a recombination laser is enhanced by cooling the electrons via collisions with a surrounding gas. This prediction has led investigators to attempt to increase the small-signal gain obtained from recombination lasers by combining inert gases at high pressures with a gaseous amplifying medium. The results obtained, as indicated in the above-cited prior art references, follow the expected trend.

SUMMARY OF THE INVENTION

A recombination laser is constructed according to the present invention by restricting the excitation in the laser amplifying medium to regions which are localized and separate from one another. This may be accomplished by a restricting means which provides separate excitation sources from a single source, e.g. a mask for a laser pump, or by a restricting means which provides for separate regions of laser amplifying material, e.g. a stripe target.

BRIEF DESCRIPTION OF THE DRAWING

A complete understanding of the present invention and of the above and other objects thereof may be gained from a consideration of the following detailed description presented hereinbelow in connection with the accompanying drawings in which.

DETAILED DESCRIPTION

The creation of a population inversion between the levels of a laser transition in the laser amplifying medium of a recombination laser is referred to as "population from above". This is accomplished by forming a plasma in the laser amplifying medium and allowing it to expand into a volume of cool gas. During this expansion plasma electrons are cooled via collisions with the cool surrounding gas, and as a consequence the electron-ion recombination rate is enhanced.

Ionization of the laser amplifying medium may be provided by such diverse mechanisms as the absorption of radiation from a laser, the absorption of energy from a beam of electrons, or by avalanche ionization by electrons obtained by irradiation of a target material fabricated from a highly volatile metal. The ionization mechanism produces a plasma in the laser amplifying medium having an electron density $n_e$ and an electron temperature $T_e$. Assume for the moment that the mechanism by which the medium is ionized is electron avalanche ionization. It is therefore advantageous to have an electron density which is high enough to efficiently ionize the constituents of the laser amplifying medium. Keeping in mind the fact that the ultimate goal is recombination, we must consider the effect of the values of $n_e$ and $T_e$ on the recombination rate.

One can parameterize the rate of recombination of multiply-charged ions with electrons in the plasma as being proportional to $n_e^2/T_e^{9/2}$. This approximate formula is useful because it indicates that the rate of recombination between ions and electrons and thereby, the rate of formation of recombination products in the laser amplifying medium, e.g. atoms or ions in an excited state, increases very strongly with decreasing $T_e$ and increasing $n_e$. It should be noted, however, that in general $n_e$ and $T_e$ are related because an increase in $n_e$ causes the electron temperature $T_e$ to rise due to recombination heating. Since the rate of recombination is such a sensitive function of $T_e$, a large effect in laser output can be achieved by even a relatively slight lowering of $T_e$.

The initial value of $T_e$ in the plasma formed in the laser amplifying medium is determined by the process by which the plasma was initiated. Thus, $T_e$ could be very high if the ionization was caused by a method employing high energy. It should be noted, of course, that high energies may be required in order to produce ions of a given charge in a laser amplifying material because of the large energy needed to remove the requisite number of electrons.

Figure 1:
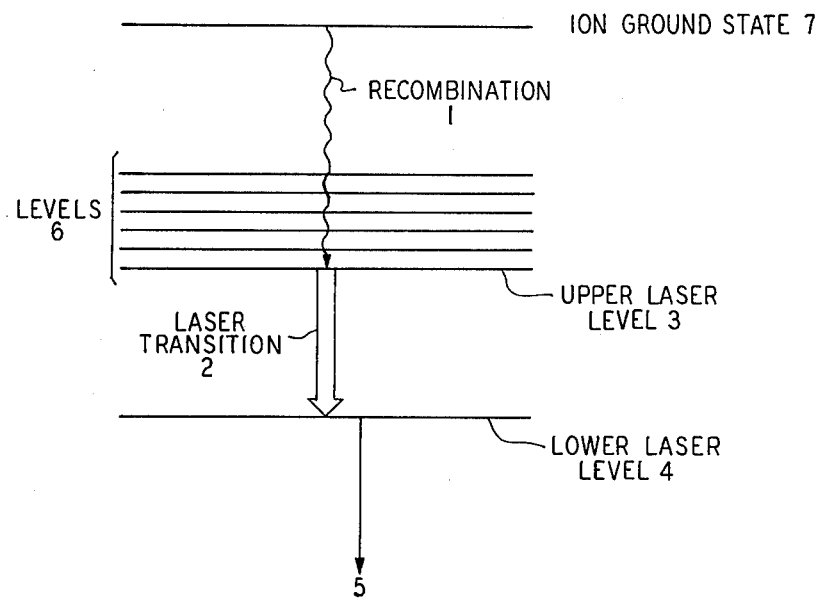
FIG. 1 shows in pictorial form the energy level diagram for a recombination laser.

FIG. 1 shows a diagram of the energy level spectrum of the highly excited states of interest for the atoms or ions comprising the laser amplifying medium. As the plasma formed in the laser amplifying medium expands outward into the surrounding gas at a high velocity, the plasma electrons are cooled by collisions with the cool surrounding gas. The plasma ions in states at or above line 7, which denotes the ion ground state, recombine with free plasma electrons, shown as arrow 1. Because of the high electron densities present, as the plasma ions recombine with free plasma electrons they move downward through the high lying levels 6 of each stage of ionization by electron collisions with other free electrons until a sufficiently large energy gap is reached. Population builds up at this bottleneck and an inversion is created with respect to lower lying levels. Thus a population inversion is built up between upper laser level 3 and lower laser level 4 to form the basis of the laser transition shown by arrow 2. Lower laser level 4 is depleted, as shown by arrow 5, by such physical mechanisms as collisional or radiative deexcitation.

In practice the mechanism for ionizing the laser amplifying medium provides a large density of electrons but at a temperature which is too high to satisfy the requirements for a population inversion to exist. This is cured by utilizing some mechanism for cooling off the electrons in the plasma. It has been suggested in the above-cited prior art references that utilization of a light buffer gas such as helium would be useful to enhance the cooling of the electrons. The electrons would be cooled rapidly as a result of elastic collisions with helium atoms and ions. This suggestion has been applied in the prior art and laser action has been achieved.

A recombination laser constructed according to the present invention has achieved a dramatic increase in the small signal gain obtained from recombination lasers constructed according to the prior art. The present invention requires that the ionization of the laser amplifying medium in a recombination laser be carried out in spatially localized regions and not uniformly over the entire laser amplifying medium as had been the practice previously. This novel concept has resulted in an unexpected increase in the power output of the recombination laser. Furthermore, one skilled in the art would have thought that exciting a more restricted amount of the laser amplifying medium would decrease the output of the laser.

It is thought that the present invention provides such an unexpectedly large increase in laser output because each of the spatially separated ionized regions in the laser amplifying medium is exposed to a proportionately greater volume of nearby buffer gas. The effect is to enhance the cooling of the electrons, i.e., to cause more efficient lowering of $T_e$. As was indicated hereinabove, it is crucial to have $T_e$ be as low as possible to maintain the population inversion of the laser transition. Thus, it is thought that the more efficient cooling of the electron temperature provided by applying the present invention more than makes up for the decreased excitation of the amplifying medium.

These results have been achieved in a transversely initiated $CO_2$ laser-produced recombination laser operating on the $5d[3/2]°-6p[3/2]$ transition at 2.026 $\mu$m in xenon. The application of the present invention has resulted in small-signal gains greater than 55 percent per centimeter of excitation length. In contrast, the maximum reported small-signal gain for this transition in a pulsed discharge xenon laser is only ~1 percent per centimeter of excitation length.

Figure 2:
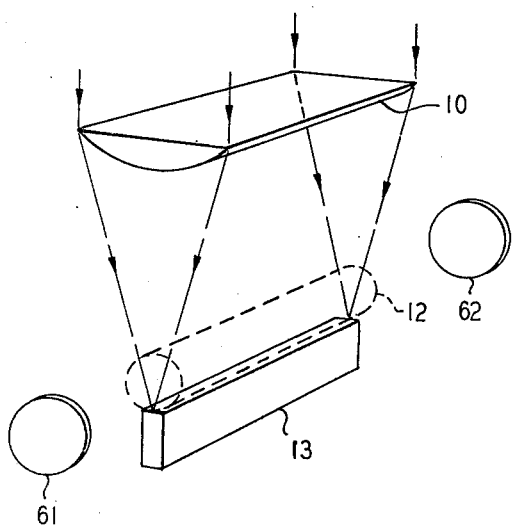
FIG. 2 shows in pictorial form the pumping mechanism used in a prior art embodiment of a laser-produced plasma-induced recombination laser.

FIG. 2 shows in pictorial form the pumping scheme for a laser-produced plasma recombination laser as found in the prior art. The pumping energy was provided by the 10 joule output from a high-pressure pulsed $CO_2$ laser which was characterized by a 70 nsec gain-switched pulse containing one-third of the energy and a 1 $\mu$sec pulse tail containing two-thirds of the energy and having a 2.5×8.9 cm rectangular cross-section. This laser beam was focused with a 7.5 cm focal length cylindrical lens 10 onto a lead target 13 situated inside a target chamber filled with a 1000:1 mixture of He:Xe at 690 Torr total pressure. Lead target 13 serves mainly to reduce the breakdown threshold for the xenon. It is thought that the target serves as a first source of electrons. The electrons, which are blown off the target when the laser pulse is focused thereupon, then precipitate the avalanche ionization of the xenon to form a plasma. The ends of the target chamber, not shown for clarity, were fitted with quartz windows set at Brewster's angle. The fabrication of this target chamber is well known to workers in the art. The particular target chamber used was a closed container of aluminum having (a) an inlet for inserting the gaseous materials, (b) quartz windows set at Brewster's angle for passage therethrough of the laser radiation, and (c) a window aperture formed from NaCl for admitting the pumping radiation from the $CO_2$ laser. The window aperture was formed from quartz when the pumping radiation originated from a Nd:YAG laser. Two gold-coated concave mirrors having a 7 m radius of curvature, 61 and 62, (one mirror was provided with a 4 mm diameter coupling hole) formed a 1 m long resonant laser cavity for the near-infrared laser output radiation. The optical axis of this resonator was positioned parallel to and 5 mm above target 13.

Figure 4:
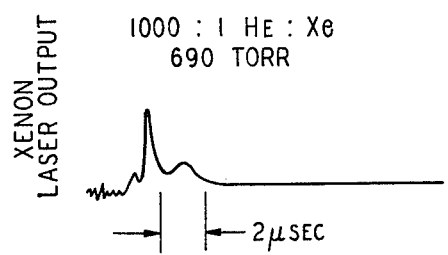
FIG. 4 shows a waveform representing the output signal from a laser-produced plasma-induced recombination laser constructed in accordance with the prior art.

For measurement purposes the laser radiation output was passed through a Si filter and onto a liquid-helium cooled Ge:Cu detector. The 10 joule pumping pulse from the $CO_2$ laser resulted in the formation of an approximately cylindrically shaped plasma 12, $\sim 8$ cm in length, in the gas directly above target 13. FIG. 4 shows the temporal behavior of the corresponding near-infrared xenon laser pulse detected; the peak amplitude of the pulse shown is $\sim 75$ watts.

Figure 3:
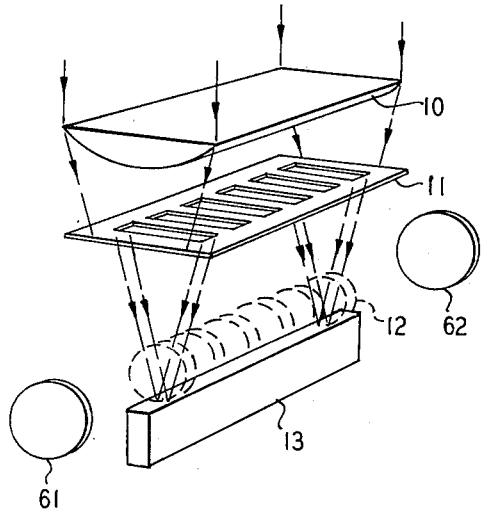
FIG. 3 shows in pictorial form the pumping mechanism of a laser-produced plasma-induced recombination laser constructed in accordance with the present invention.
Figure 5:
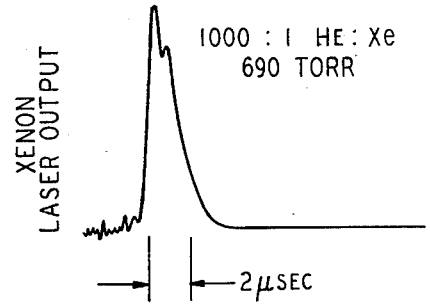
FIG. 5 shows a waveform representing the output signal from a laser-produced plasma-induced recombination laser constructed in accordance with the present invention.

The pumping pulse from the $CO_2$ laser was modified, as shown in FIG. 3, in accordance with the present invention to provide a periodic spatial variation in the radiation at target 13 by using mask 11, which was opaque to the 10.6 $\mu$m $CO_2$ laser radiation except for six 3 mm wide slots spaced 9 mm apart. All other elements in FIG. 3, having identical numerals as in FIG. 2, operate in the same fashion as described hereinabove in connection with FIG. 2. The $CO_2$ laser pulse transmitted by the mask contained only 2.25 joules of energy and resulted in the formation of six individual plasmas 12 in the gas directly above the target. The resultant near-infrared xenon laser pulse output is shown in FIG. 5. The output shown has a peak amplitude of 225 watts. The data shown in FIGS. 4 and 5 demonstrate that the presence of a periodic spatial variation in the pumping radiation has caused a three-fold increase in the peak output power and a six-fold increase in pulse energy. Since both of these improvements were accomplished using a $CO_2$ pumping pulse containing less than one-fourth the original total input energy, the net overall improvement in peak output power is more than 13 times and the improvement in pulse energy is more than 26 times.

Figure 6:
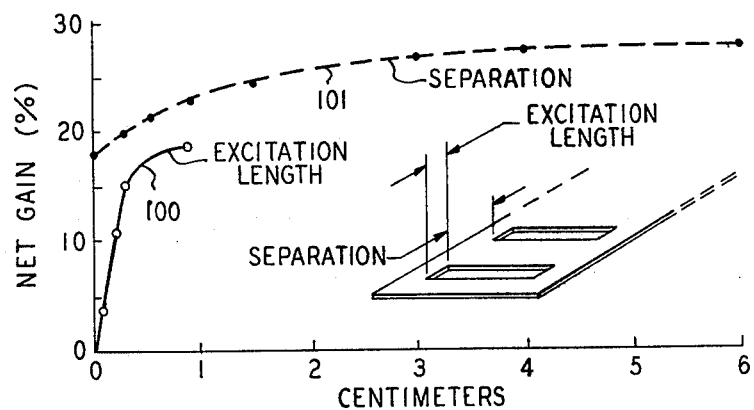
FIG. 6 shows a graph of (a) the net gain of a laser-produced plasma-induced recombination laser as a function of the excitation length of the localized regions of excitation and (b) the net gain of a laser-produced plasma induced recombination laser produced by two individual localized regions of excitation in the laser amplifying medium as a function of their separation.
Figure 7:
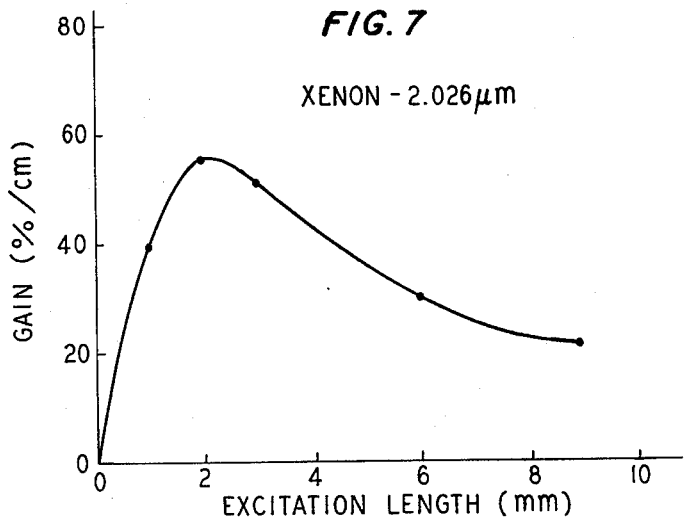
FIG. 7 shows a graph of the gain per unit excitation length in a laser-produced plasma-induced recombination laser.

The important parameters for pumping the laser according to the present invention are the excitation length and the separation length. The excitation length is the length of a single plasma section or excitation region in the laser amplifying medium and the separation length is the distance between adjacent excitation regions in the laser amplifying medium. These parameters were studied for the xenon laser described hereinabove and the results are shown in FIGS. 6 and 7. FIG. 6 shows a measurement of the gain produced by a single excitation region in the laser amplifying medium, illustrated by curve 100. Curve 100 was created by the following procedure:

(1) The xenon 2.026 $\mu$m laser was made to oscillate with a single short $CO_2$ laser-produced xenon plasma excitation region, (2) the length of this plasma was adjusted ($\sim 2$ to 3 mm) so that the 2.026 mm laser was just at the threshold of oscillation, (3) a second $CO_2$ laser-produced xenon plasma excitation region was produced in the same 2.026 $\mu$m laser resonator, but at a large distance (18 cm) from the first plasma excitation region, and (4) the excess gain produced by this second plasma excitation region was measured by inserting known losses into the laser resonator which were sufficient to reduce the net gain to zero. Curve 100 shows the results of the above measurements for various excitation lengths.

Curve 101 in FIG. 6 shows the net gain at 2.026 $\mu$m produced by two individual plasmas, each having a 3 mm excitation length as a function of their separation. It is to be noted that when the separation was reduced to zero, the plasmas behaved as a single plasma having a 6 mm excitation length and at large separations the two plasmas gave twice the gain of a single plasma.

FIG. 7 shows the gain per unit excitation length as a function of excitation length obtained from the data shown in curve 100 in FIG. 6. We see that for an excitation length of 2 mm the gain exceeds 55 percent per centimeter. This is more than 50 times greater than the highest previously reported small-signal gain for this transition in xenon in an electrical discharge and clearly demonstrates the advantages obtained when constructing the recombination laser according to the present invention.

The discussion presented hereinabove with respect to the reduction to practice of this invention pertinent to a xenon 2.026 $\mu$m laser is not meant to exclude the applicability of this invention to other recombination lasers in any way. For example, the pumping means used to form a laser-produced plasma may be a Nd:YAG laser as well as a $CO_2$ laser or it may be any coherent source capable of generating sufficient peak power density to create a laser-produced plasma. Furthermore the present invention is not confined to laser-produced plasma excitations. For example, these plasmas may also be produced by electron, ion, and other particle beam bombardment of the laser amplifier medium.

It should also be made clear that the description presented hereinabove with respect to the reduction to practice of this invention pertinent to a xenon 2.026 $\mu$m laser is not meant to provide a determination of any particular plasma excitation length or separation length to be used generally. It is fully expected that recombination lasers producing radiation from energy levels of more highly ionized species of the constituents of the laser amplifying medium will result in plasma expansions that are more highly directional than those presented in the reduction to practice discussed with respect to the xenon 2.026 $\mu$m radiation. This may enable the use of smaller plasma excitation region separation lengths with these laser amplifying media.

We note that the discussion presented hereinabove is not meant to restrict the present invention solely to the use of masks to provide spatially separated regions of excitation in the laser amplifying medium. Any scheme used for producing the spatially separated regions of excitation are included in the present invention as being substantially equivalent to the masks. Examples of other components which may serve as alternatives to masks when the laser amplifying medium is excited by radiation are shown in FIGS. 8-14. Note: the embodiments shown in FIGS. 8-11 have pumping with radiation only, whereas the embodiments shown in FIGS. 12-14 have pumping with either particle beams or radiation.

Figure 8:
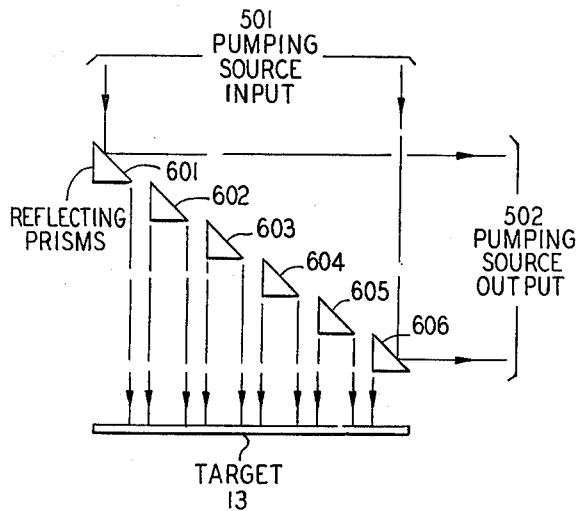
FIG. 8 shows in pictorial form the pumping mechanism in an embodiment of the present invention using reflecting surfaces to restrict the excitation of the laser amplifying medium to localized regions.

In FIG. 8 a sequence of reflecting prisms or mirrors 601-606 reflects radiation at the wavelengths contained in beam 501 to provide a periodic spatial illumination of target 13. Reflected radiation beam 502 may be further utilized.

Figure 9:
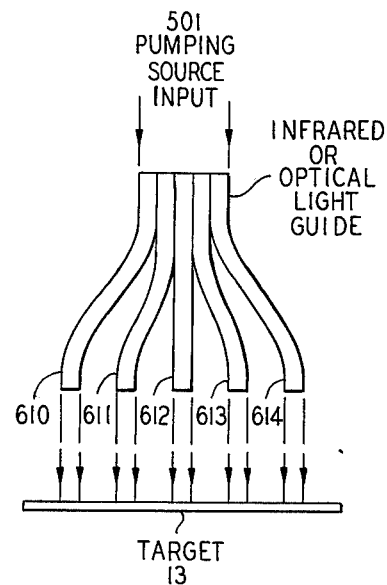
FIG. 9 shows in pictorial form the pumping mechanism in an embodiment of the present invention using light guides to restrict the excitation of the laser amplifying medium to localized regions.

In FIG. 9 beam 501 is coupled into the end of either a fiber bundle or any other array of light guides (610-614). These light guides are separated near target 13 in order to provide spatial separated regions of excitation.

Figure 10:
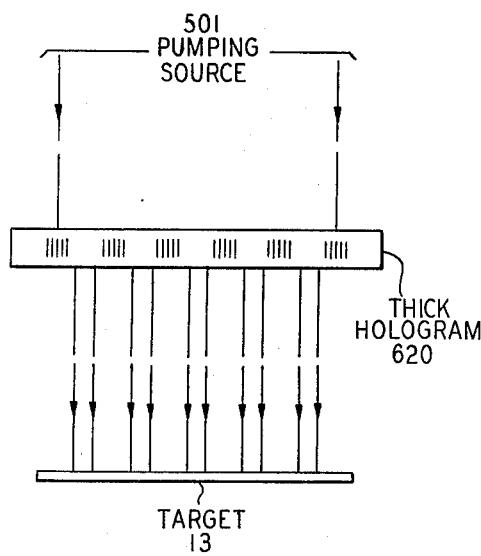
FIG. 10 shows in pictorial form the pumping mechanism in an embodiment of the present invention using a thick hologram to restrict the excitation of the laser amplifying medium to localized regions.

In FIG. 10 thick hologram 620 provides the spatially desired pattern of illumination for target 13. The thick hologram material may illustratively be a dichromated gelatin. Further, a metal reflection hologram created by exposing the metal with light which has been impressed with the desired pattern may be used with an infrared pumping beam to provide the desired spatial variation on target 13.

Figure 11:
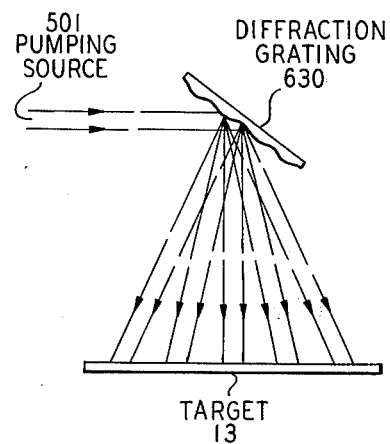
FIG. 11 shows in pictorial form the pumping mechanism in an embodiment of the present invention using a reflecting diffraction grating to restrict the excitation of the laser amplifying medium to localized regions.

In FIG. 11 diffraction grating 630 provides the desired spatial pattern of illumination of target 13. The diffraction grating is used in the Raman-Nath mode so that multiple orders are produced.

Figure 12:
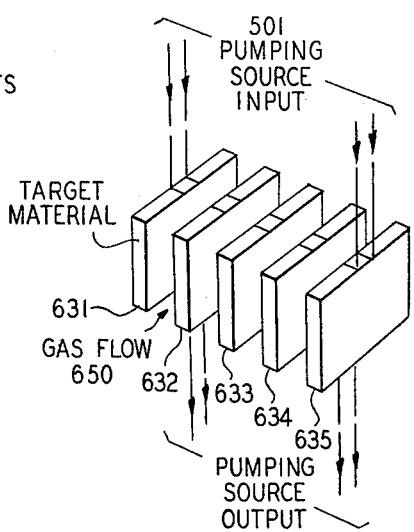
FIG. 12 shows in pictorial form the excitation elements of an embodiment of the present invention, which embodiment uses bar targets to restrict the excitation of the laser amplifying medium to localized regions.
Figure 13:
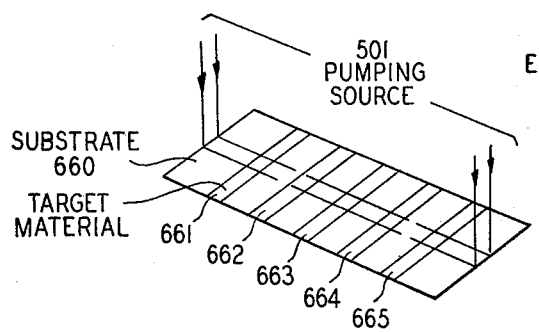
FIG. 13 shows in pictorial form the excitation elements of an embodiment of the present invention, which embodiment uses evaporated stripe targets to restrict the excitation of the laser amplifying medium to localized regions.
Figure 14:
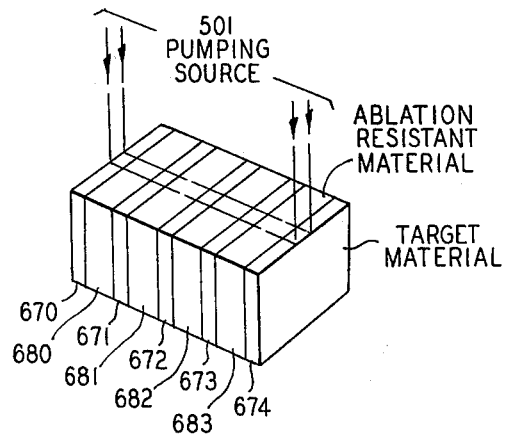
FIG. 14 shows in pictorial form the excitation elements of an embodiment of the present invention, which embodiment uses sandwich targets to restrict the laser excitation of the amplifying medium to localized regions.

The embodiments shown in FIGS. 12–14 show a further aspect of the present invention where the localized regions of excitation in the laser amplifying medium are produced by providing spatially separated regions of laser amplifying medium. The excitation in these embodiments may be produced by an excitation means, such as laser radiation or a beam of particles such as electrons, protons, or ions, which does not have to have a spatial dependence impressed upon it. Thus, these embodiments provide the localized regions of excitation by restricting the target materials to localized regions whereas the previously discussed embodiments utilized restriction means to produce radiation or particle beams which impinged on the target material in localized regions. In FIG. 12 the target material comprises an array of bars of target material (631–635). Radiation or particles from beam 501 will create a plasma in the laser amplifying medium in the area where the pumping radiation or particles impinges upon the target material. The array of bars of target material produces the locally excited regions in the laser amplifying medium. This apparatus also provides a convenient method for introducing a background gas into the target region. Arrow 650 shows the direction of flow of the gas.

In FIG. 13 target material 661–665 is evaporated onto an ablation resistant substrate 660. When radiation or particles from beam 501 impinges upon the target material the plasmas are formed in localized regions close to the target material 661–665.

In FIG. 14 the target comprises alternating layers of target material (670–674) and an ablation resistant material (680–683). The operation of this target is the same as has been described above with respect to FIG. 13.

We claim:

1. A recombination laser comprising:
   a resonant laser cavity including means for extracting laser radiation;
   a laser amplifying medium;
   excitation means for producing an ionized laser amplifying medium in said resonant laser cavity; and
   a background gas in said resonant laser cavity for deenergizing electrons obtained from the ionization of said laser amplifying medium, whereby said electrons recombine with the ions of said laser amplifying medium to produce a population inversion in said laser amplifying medium;
   characterized in that
   said excitation means is a means for generating a plurality of localized regions of ionized laser amplifying medium, each one of which localized regions is separated from the other regions.

2. The recombination laser as defined in claim 1 further characterized in that said excitation means comprises a source of laser radiation for producing laser radiation and a mask having apertures for producing spatially separate resultant beams of laser radiation in response to laser radiation from said source impinging upon said mask, which spatially separate resultant beams impinge upon said laser amplifying medium to produce said plurality of localized regions.

3. The recombination laser as defined in claim 2 wherein said source is a $CO_2$ laser.

4. The recombination laser as defined in claim 2 wherein said source is a Nd:YAG laser.

5. The recombination laser as defined in claim 3 wherein said laser amplifying medium is xenon and said background gas is helium.

6. The recombination laser as defined in claim 1 further characterized in that said excitation means comprises a source of laser radiation for producing laser radiation and reflecting surface means being reflective to laser radiation from said source for producing spatially separate resultant beams of laser radiation in response to laser radiation from said source impinging upon said reflecting surface means, which spatially separate resultant beams impinge upon said laser amplifying medium to produce said plurality of localized regions.

7. The recombination laser as defined in claim 1 further characterized in that said excitation means comprises a source of laser radiation for producing laser radiation and light guide means for producing spatially separate resultant beams of laser radiation in response to laser radiation from said source impinging upon said light guide means, which spatially separate resultant beams impinge upon said laser amplifying medium to produce said plurality of localized regions.

8. The recombination laser as defined in claim 1 further characterized in that said excitation means comprises a source of laser radiation for producing laser radiation and a thick hologram means for producing separate resultant beams of laser radiation in response to laser radiation from said source impinging upon said thick hologram means, which spatially separate resultant beams impinge upon said laser amplifying medium to produce said plurality of localized regions.

9. The recombination laser as defined in claim 1 further characterized in that said excitation means comprises a source of laser radiation for producing laser radiation and a diffraction grating operated in the Raman-Nath mode for producing spatially separate resultant beams of laser radiation in response to laser radiation from said source impinging upon said diffraction grating operated in the Raman-Nath mode, which spatially separate resultant beams impinge upon said laser amplifying medium to produce said plurality of localized regions.

10. The recombination laser as defined in claim 1 further characterized in that said excitation means comprises a source of particles for producing a beam of particles and a mask for producing spatially separate resultant beams of particles in response to said beam of particles impinging upon said mask, which spatially separate resultant beams of particles impinge upon said laser amplifying medium to produce said plurality of localized regions.

11. The recombination laser as defined in claim 10 wherein said source of particles is a source of electrons.

12. The recombination laser as defined in claim 1 further characterized in that said excitation means comprises a multiplicity of sources of laser radiation, each one of which sources produces a beam of laser radiation which is spatially separate from each other beam of laser radiation, which multiplicity of spatially separate beams of laser radiation impinge upon said laser amplifying medium to produce said plurality of localized regions.

13. A recombination laser comprising:

a resonant laser cavity including means for extracting laser radiation;
a laser amplifying medium;
excitation means for producing an ionized laser amplifying medium in said resonant laser cavity; and
a background gas in said resonant laser cavity for deenergizing electrons obtained from the ionization of said laser amplifying medium whereby said electrons recombine with the ions of said laser amplifying medium to produce a population inversion in said laser amplifying medium;
characterized in that
said laser amplifying medium is disposed in regions which are separated from one another, whereby a plurality of localized regions of ionized laser amplifying medium is generated, each one of which localized regions is separated from the other regions.

14. The recombination laser as defined in claim 13 wherein said excitation means comprises a source of particles for producing a uniform beam of particles.

15. The recombination laser as defined in claim 14 wherein said source of particles is a source of electrons.

16. The recombination laser as defined in claim 14 wherein said laser amplifying medium comprises a thin film of alternating stripes of a laser amplifying material and an ablation resistant material.

17. The recombination laser as defined in claim 13 wherein said excitation means comprises a laser source of radiation for producing a uniform beam of laser radiation.

18. The recombination laser as defined in claim 17 wherein said laser amplifying medium comprises a thin film of alternating stripes of a laser amplifying material and an ablation resistant material.

* * * * *